US008998505B2

(12) United States Patent
Motofuji (10) Patent No.: US 8,998,505 B2
(45) Date of Patent: Apr. 7, 2015

(54) OPTICAL CONNECTOR

(71) Applicant: Suncall Corporation, Kyoto (JP)

(72) Inventor: Akira Motofuji, Kyoto (JP)

(73) Assignee: Suncall Corporation, Kyoto (JP)

( * ) Notice: Subject to any disclaimer, the term of this patent is extended or adjusted under 35 U.S.C. 154(b) by 196 days.

(21) Appl. No.: 13/890,531

(22) Filed: May 9, 2013

(65) Prior Publication Data

US 2013/0301994 A1 Nov. 14, 2013

(30) Foreign Application Priority Data

May 10, 2012 (JP) ................................. 2012-108480

(51) Int. Cl.
*G02B 6/36* (2006.01)
*G02B 6/38* (2006.01)

(52) U.S. Cl.
CPC ............... *G02B 6/36* (2013.01); *G02B 6/3879* (2013.01)

(58) Field of Classification Search
None
See application file for complete search history.

(56) References Cited

U.S. PATENT DOCUMENTS

| 2013/0216188 | A1* | 8/2013 | Lin et al. | 385/77 |
| 2014/0185988 | A1* | 7/2014 | Qi et al. | 385/77 |
| 2014/0321821 | A1* | 10/2014 | Hsieh | 385/93 |
| 2015/0003790 | A1* | 1/2015 | Wu et al. | 385/81 |

FOREIGN PATENT DOCUMENTS

JP 2006-018296 1/2006

* cited by examiner

*Primary Examiner* — Sung Pak
(74) *Attorney, Agent, or Firm* — Wenderoth, Lind & Ponack, LLP (57) ABSTRACT

An optical connector of the present invention comprising a regulating member having regulating portion provided between a lower surface of an operation arm and an upper surface of a retainer. The regulating member movable in a longitudinal direction between a regulating position for regulating downward movement of a front end of the operation arm by the regulating portion and a retracted position for allowing the downward movement of the front end of the operation arm. The retracted position is located behind the regulating position.

6 Claims, 6 Drawing Sheets

OPTICAL CONNECTOR

TECHNICAL FIELD

The present invention relates to an optical connector.

BACKGROUND ART

An optical connector including a latch arm (LC connector, for example) is known as a type of optical connector. This type of optical connector is inserted into a mounting hole of an optical adapter while the latch arm is depressed to be elastically deformed. When the optical connector reaches a predetermined position, the latch arm is elastically restored to an original state. Then, a locking portion provided to the latch arm of the optical connector and a locking groove provided to the optical adapter come into engagement with each other. As a result, the removal of the optical connector from the optical adapter is regulated. To remove the optical connector from the optical adapter, the latch arm is depressed to disengage the locking portion of the latch arm and the locking groove of the optical adapter from each other. In this disengaged state, the optical connector is pulled away from the optical adapter.

In a state in which the optical connector described above is mounted to the optical adapter, the most part of the latch arm is housed inside the optical adapter. Therefore, it becomes extremely difficult to perform an operation of depressing the latch arm to remove the optical connector. Therefore, the following configuration is known to cope with the above-mentioned problem. Specifically, an operation arm is provided behind the latch arm (on a side away from the optical adapter). A front end of the operation arm is provided above a rear end of the latch arm. By depressing the operation arm, the latch arm is depressed (for example, Patent Literature 1).

CITATION LIST

Patent Literature 1: JP 2006-18296 A

SUMMARY OF INVENTION

Technical Problem

If any object unexpectedly comes into contact with the operation arm of the optical connector described above in a state in which the optical connector is mounted to the optical adapter, there is a fear in that the optical connector is undesirably removed from the optical adapter. In a case of a configuration in which a ferrule is pushed forward (toward the optical adapter) by a spring, in particular, a housing of the optical connector is biased backward (to the side away from the optical adapter) by a counteraction. Therefore, even a light contact with the operation arm undesirably removes the optical connector from the optical adapter. For example, when a person (or an object) other than a specific worker scarcely comes into contact with the optical connector as in a case of an optical connector mounted to an optical adapter of an optical server, the above-mentioned trouble is unlikely to occur. In a case of an optical connector mounted to an optical adapter of an apparatus installed in a general household or a public place, however, a person (or an object) other than the specific worker may come into contact with the operation arm. Therefore, the above-mentioned trouble is likely to occur.

For example, if a cover is provided above the operation arm so as to cover the operation arm, the above-mentioned trouble can be avoided. In this case, however, a space for providing the cover is required above the operation arm, which disadvantageously increases the optical connector in size.

It is an object of the present invention to prevent an event in which an optical connector is unexpectedly removed from an optical adapter without increasing the optical connector in size.

Solution to Problem

An optical connector according to an exemplary embodiment of the present invention, which is devised to attain the above-mentioned object, comprises: a ferrule; a retainer for retaining the ferrule inside thereof; a latch arm extending backward from an upper surface of the retainer, the latch arm comprising a rear end elastically movable in a vertical direction; an operation arm extending forward from the upper surface of the retainer, the operation arm comprising a front end elastically movable in the vertical direction and provided above the rear end of the latch arm; and a regulating member having a regulating portion provided between a lower surface of the operation arm and the upper surface of the retainer. The regulating member is movable in a longitudinal direction between a regulating position for regulating downward movement of the front end of the operation arm by the regulating portion and a retracted position for allowing the downward movement of the front end of the operation arm, the retracted position being located behind the regulating position.

As described above, the regulating portion of the regulating member is provided between the lower surface of the operation arm and the upper surface of the retainer. Then, the regulating member is located in the regulating position. As a result, the front end of the operation arm can be supported from below to regulate the downward movement of the front end of the operation arm by the regulating portion. In this case, the regulating portion is provided below the operation arm. Therefore, a cover is not required to be provided above the operation arm, and hence the optical connector can be prevented from being increased in size. To remove the optical connector from the optical adapter, the regulating member only needs to be retracted from the regulating position to allow the downward movement of the front end of the operation arm.

The regulating member may further comprise, for example, a base portion provided behind the operation arm; and a connecting portion for connecting the regulating portion and the base portion to each other. In this case, through the movement of the regulating member in the longitudinal direction by holding the base portion of the regulating member, the regulating member can be moved between the regulating position and the retracted position.

It is preferred that the above-mentioned optical connector further comprise a locking mechanism for regulating movement of the regulating member in the longitudinal direction while keeping the regulating member in the regulating position. With the locking mechanism, after the optical connector is mounted to the optical adapter and the regulating member is located in the regulating position, the movement of the regulating member in the longitudinal direction is regulated by the locking mechanism. As a result, an event in which the regulating member is offset from the regulating position to unexpectedly cancel the regulation on the downward movement of the operation arm by the regulating portion can be prevented. For example, the optical connector may further comprise: a slit provided to the retainer; and a locking piece insertable into the slit and provided to the regulating member, and the slit and the locking piece may constitute the locking mechanism.

When the operation arm comprises a horizontal portion approximately parallel to the upper surface of the retainer, a space extending in the longitudinal direction and having an approximately constant height is formed below the operation arm. Therefore, the regulating portion can move easily in the space in the longitudinal direction, and the regulating member can be easily moved backward from the regulating position to the retracted position.

Advantageous Effects of Invention

As described above, according to the present invention, it is possible to prevent the event in which the optical connector is unexpectedly removed from the optical adapter without increasing the optical connector in size.

DESCRIPTION OF EMBODIMENTS

Embodiments of the present invention are hereinafter described referring to the accompanying drawings.

Figure 1:
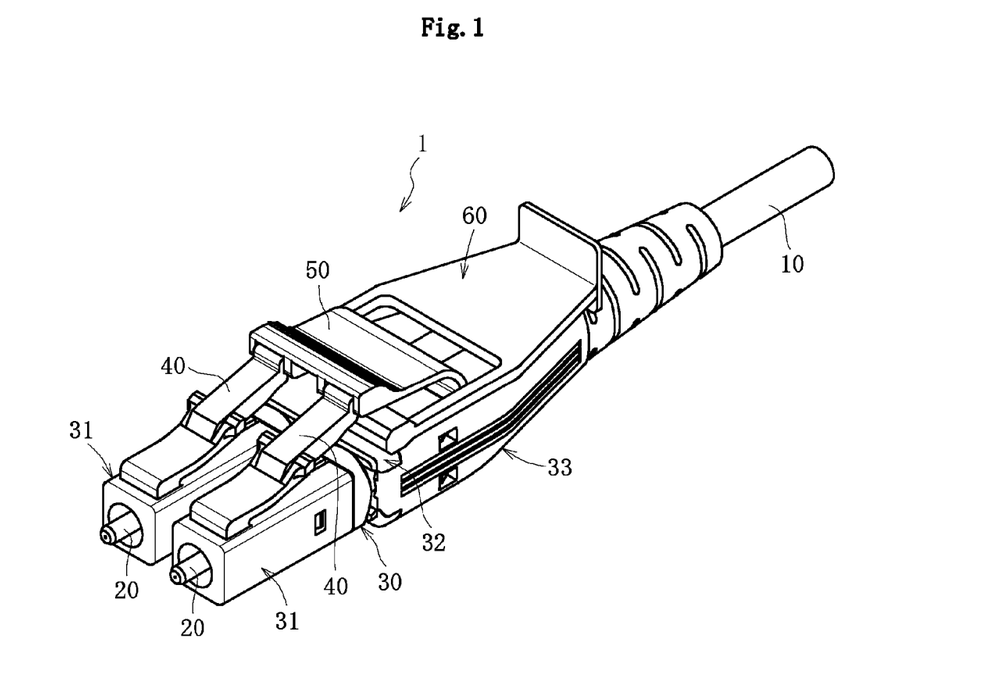
FIG. 1 A perspective view of an optical connector according to an embodiment of the present invention.
Figure 2:
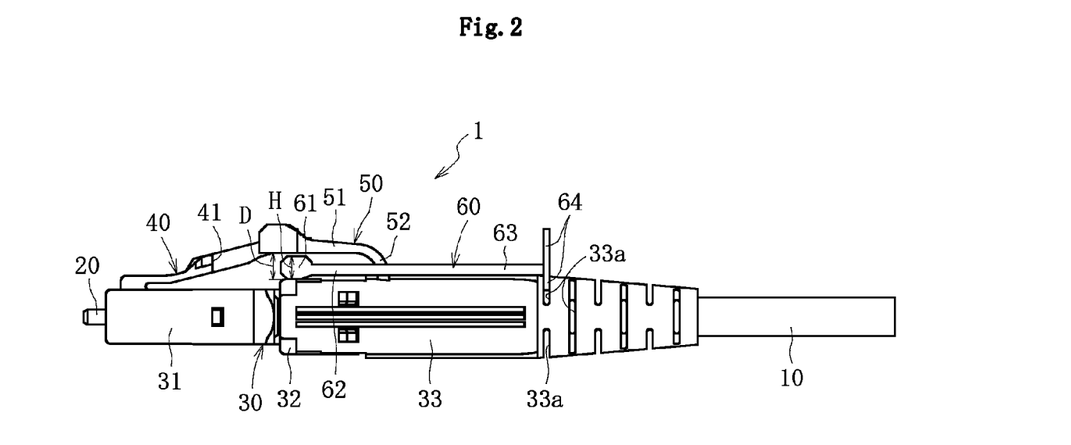
FIG. 2 A side view of the optical connector in a state in which a regulating member is located in a regulating position.

An optical connector 1 according to an embodiment of the present invention is an LC connector as illustrated in FIGS. 1 and 2. At the same time, the optical connector 1 is a double-fiber optical connector comprising a pair of ferrules 20. Specifically, the optical connector 1 comprises the pair of ferrules 20, a retainer 30, latch arms 40, an operation arm 50, and a regulating member 60. The pair of ferrules 20 is mounted to a distal end of a double-fiber cable 10. The retainer 30 retains the ferrules 20 inside thereof. The latch arms 40 and the operation arm 50 are provided on an upper surface of the retainer 30. The regulating member 60 is provided as a member independent of the retainer 30. In the following, a direction of center axes of the ferrules 20 (horizontal direction in FIG. 2) is referred to as "longitudinal direction", a vertical direction in FIG. 2 is referred to as "vertical direction", and a direction perpendicular to the longitudinal direction and the vertical direction (direction perpendicular to the drawing sheet of FIG. 2) is referred to as "width direction". Moreover, a distal-end side of the ferrules 20 in the longitudinal direction (left in FIG. 2) is referred to as "front side", whereas the opposite side (right in FIG. 2) is referred to as "rear side". The terms described above are used for convenience of the description, and do not mean to limit a mode of use of the optical connector 1.

Figure 3:
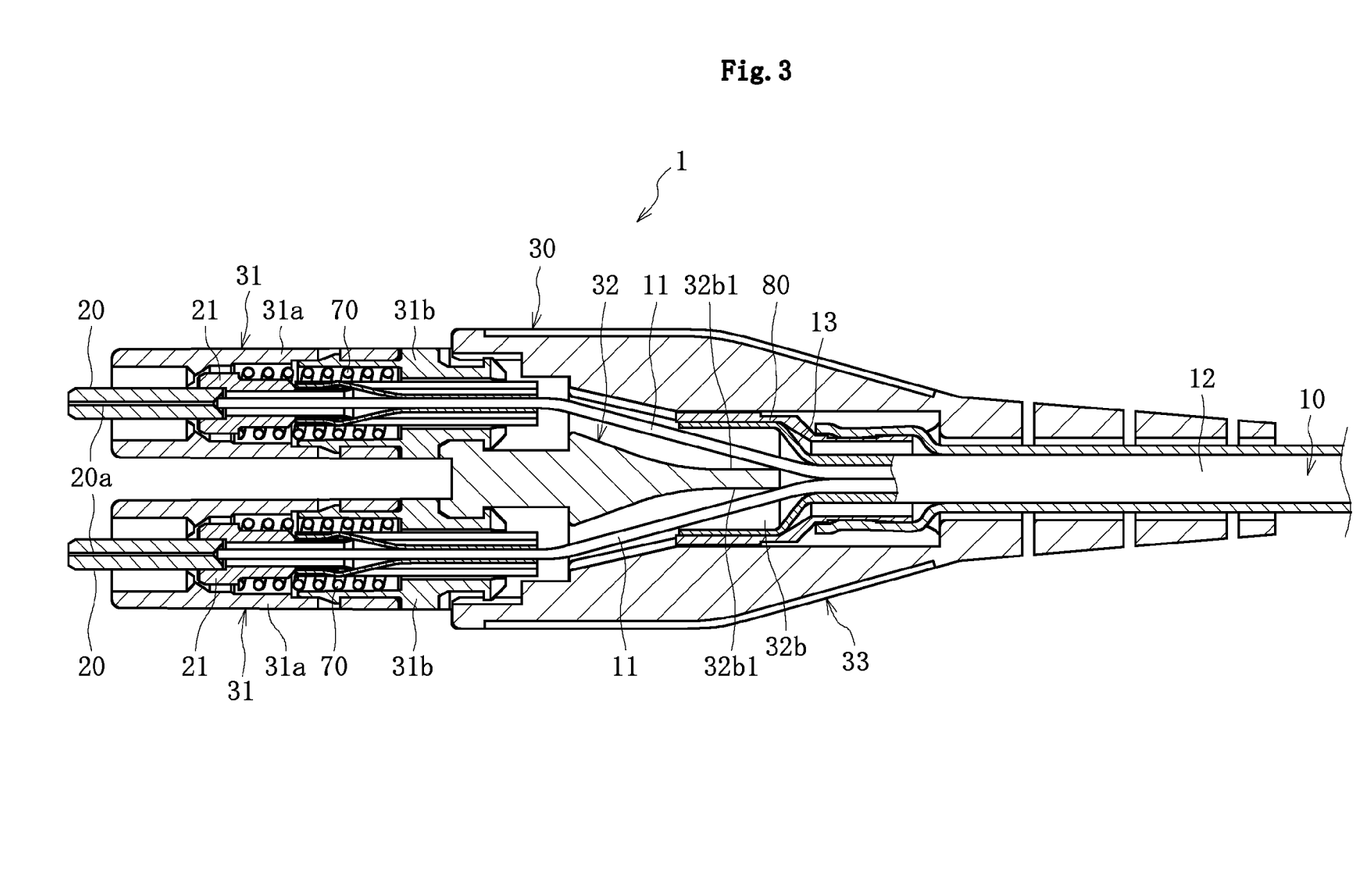
FIG. 3 A sectional view of the optical connector.

As illustrated in FIG. 3, the double-fiber cable 10 comprises a pair of bare fibers 11, a covering tube 12, and a reinforcing fiber 13. The pair of bare fibers 11 comprises optical fibers incorporated therein. The covering tube 12 covers an outer circumference of the pair of bare fibers 11 to integrate the bare fibers 11 into one bundle. The reinforcing fiber 13 fills a gap between the bare fibers 11 and the covering tube 12.

Each of the ferrules 20 is formed of, for example, zirconia to have a cylindrical shape. A flange portion 21 is fixed to a rear end of each of the ferrules 20. Corresponding one of the bare fibers 11 is inserted into the flange portion 21 so as to be located inside an inner circumference of the flange portion 21. A distal end of each of the bare fibers 11 is mounted to the rear end of corresponding one of the ferrules 20. The optical fiber (not shown) incorporated into the bear fiber 11 is inserted into an insertion hole 20a of the ferrule 20.

The retainer 30 comprises a pair of housings 31, a clip 32, and a boot 33 (see FIGS. 1 and 2). Each of the housings 31 retains corresponding one of the ferrules 20 and corresponding one of the flange portions 21 inside an inner circumference thereof. The clip 32 retains rear edges of the pair of housings 31 to integrate the pair of housings 31 into one unit. The boot 33 is mounted to the clip 32.

Each of the housings 31 comprises a main body portion 31a and a cap 31b as illustrated in FIG. 3. Each of the housings 31 comprises a through hole extending in the longitudinal direction. In the through hole, the ferrule 20, the flange portion 21, and the bare fiber 11 are housed. A spring 70 is mounted in a compressed state between the flange portion 21 and the cap 31b in the longitudinal direction. By an elastic force of the spring 70, the ferrule 20 is biased forward.

Figure 4:
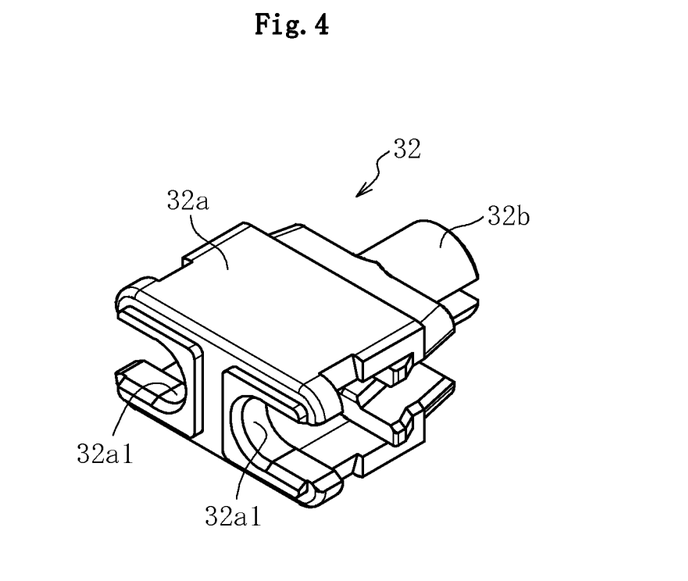
FIG. 4 A perspective view of a retainer of the optical connector.

The clip 32 comprises a main body portion 32a and a cable fixing portion 32b as illustrated in FIG. 4. The cable fixing portion 32b projects backward from the main body portion 32a. A pair of mounting portions 32a1 is provided to the main body portion 32a. The pair of mounting portions 32a1 retains the pair of housings 31 in state in which the housings 31 are separated away from each other in the width direction and arranged in parallel to each other. The cable fixing portion 32b forms an approximately column-like shape. On both side surfaces of the cable fixing portion 32b in the width direction, a pair of guide grooves 32b1 for guiding the pair of bare fibers 11 is formed (see FIG. 3). The guide grooves 32b1 are curved outward in the width direction so as to be separated away from each other as becoming closer to the front side. The pair of guide grooves 32b1 extends into the interior of the main body portion 32a. An outer circumference of the cable fixing portion 32b is covered with the reinforcing fiber 13. A cylindrical caulking member 80 is mounted on an outer circumference of the cable fixing portion 32b covered with the reinforcing fiber 13. The double-fiber cable 10 is fixed to the clip 32 by fastening an outer circumference of the caulking member 80.

The boot 33 is formed of a flexible material (elastomer, for example) and covers an outer circumference of the double-fiber cable 10 extending backward from the cable fixing portion 32b of the clip 32 (see FIG. 3). A plurality of slits 33a for smoothly curving the boot 33 are provided in the vicinity of a rear end of the boot 33 (see FIG. 2). In the illustrated example, the plurality of slits 33a each extending in a direction perpendicular to the longitudinal direction are provided at equal intervals in the longitudinal direction. Specifically, the slits 33a provided on an upper surface and a lower surface of the boot 33 and the slits 33a provided on both side surfaces of the boot 33 in the width direction are arranged alternately in the longitudinal direction.

Each of the latch arms 40 extends obliquely upward from an upper surface of the retainer 30 toward the rear side. A rear end of each of the latch arms 40 is elastically movable in the vertical direction (see FIG. 2). In this embodiment, the latch arms 40 and the main body portions 31a of the housings 31 are formed of a resin by integral molding. In middle of each of the latch arms 40, a locking portion 41 is provided. By bringing the locking portion 41 and a locking groove (not shown) provided to an optical adapter into engagement with each other in the longitudinal direction, the optical connector 1 is retained to the optical adapter.

The operation arm 50 extends forward from the upper surface of the retainer 30. A front end of the operation arm 50 is elastically movable in the vertical direction. The front end of the operation arm 50 is provided above the rear ends of the latch arms 40. In this embodiment, the operation arm 50 and the boot 33 are formed of an elastomer by integral molding. The operation arm 50 comprises a horizontal portion 51 approximately parallel to an upper surface of the boot 33. A rear end of the horizontal portion 51 is connected to the upper surface of the boot 33 through a continuous portion 52. The continuous portion 52 stands upward from the upper surface of the boot 33 in an approximately vertical direction and is curved so as to be in smooth connection to the horizontal portion 51. A front end of the horizontal portion 51 is held in contact with upper surfaces of the rear ends of the latch arms 40.

Figure 5:
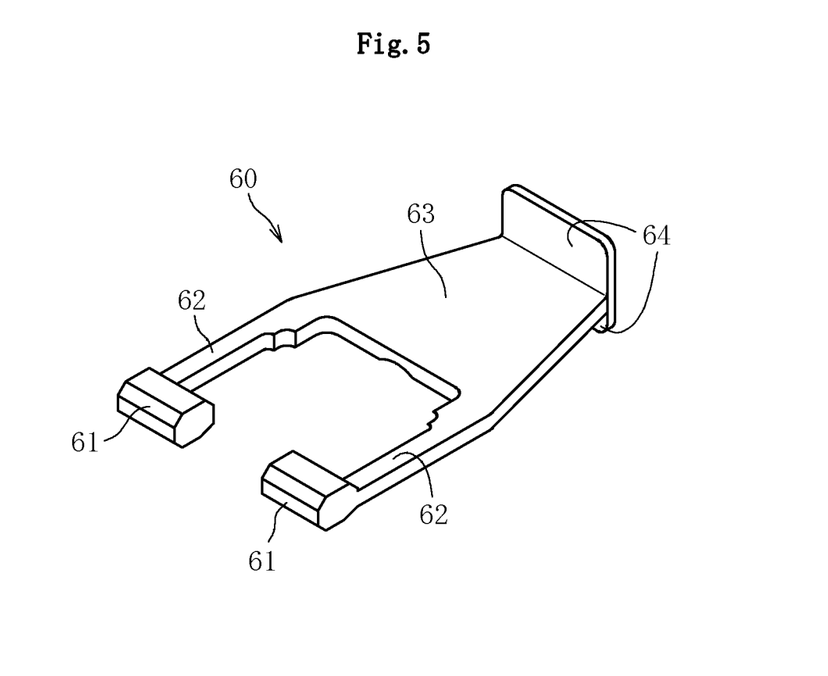
FIG. 5 A perspective view of the regulating member of the optical connector.

As illustrated in FIG. 5, the regulating member 60 comprises regulating portions 61, a base portion 63, and a connecting portion for connecting the regulating portions 61 and the base portion 63. In this embodiment, the connecting portion is formed of a pair of arms 62. The regulating portions 61 are provided to the front ends of the pair of arms 62 so as to project inward in the width direction. The pair of arms 62 and the base portion 63 are formed to have an approximately flat plate-like shape. A locking piece 64 is provided so as to project vertically from a rear end of the base portion 63. In the illustrated example, the amount of upward projection of the locking piece 64 from the base portion 63 and the amount of downward projection of the locking piece 64 from the base portion 63 differ from each other. In a state in which the regulating member 60 is assembled to the optical connector 1, as illustrated in FIG. 2, the regulating portions 61 are provided between a lower surface of the operation arm 50 and the upper surface of the retainer 30 (clip 32), whereas the base portion 63 is provided behind the operation arm 50. A vertical size H of each of the regulating portions 61 is set almost equal to a vertical distance D between the lower surface of the front end of the operation arm 50 and the upper surface of the boot 33. In the illustrated example, the vertical size H is set slightly smaller than the vertical distance D.

The regulating member 60 is movable in the longitudinal direction with respect to the retainer 30 and the operation arm 50. Specifically, the regulating member 60 is movable in the longitudinal direction between a regulating position (see FIG. 2) and a retracted position (see FIG. 6). After the optical connector 1 having the configuration described above is mounted to the optical adapter, as illustrated in FIG. 2, the regulating portions 61 of the regulating member 60 are located below the front end of the operation arm 50 (regulating position). As a result, the downward movement of the front end of the operation arm 50 is regulated by the regulating portions 61. Therefore, the downward movement of the latch arms 40 is also regulated. Accordingly, an event in which the optical connector 1 is unexpectedly removed from the optical adapter can be prevented.

Moreover, in this embodiment, there is provided a locking mechanism for regulating the movement of the regulating member 60 in the longitudinal direction while keeping the regulating member 60 in the regulating position. Specifically, the locking mechanism comprises the locking piece 64 of the regulating member 60 and the slits 33a of the boot 33. More specifically, by inserting the locking piece 64 of the regulating member 60 into one of the slits 33a of the boot 33, the locking piece 64 and the corresponding slit 33a are engaged in the longitudinal direction to regulate the movement of the regulating member 60 in the longitudinal direction. In this manner, the regulating member 60 can be fixed in the regulating position. When the amount (height) of upward projection and the amount (height) of downward projection of the locking piece 64 are set so as to be different from each other as in this embodiment, the orientation of the locking piece 64 can be changed for use in accordance with a distance between the base portion 63 of the regulating member 60 and the slit 33a to which the locking piece 64 is inserted. Therefore, the versatility of the regulating member 60 can be expanded. On the other hand, when the amount of upward projection and the amount of downward projection of the locking piece 64 are set equal to each other (not shown), the regulating member 60 has a vertically symmetrical shape. Therefore, the regulating member 60 can be assembled to the optical connector 1 without paying attention to the vertical direction of the regulating member 60 for assembly.

Figure 6:
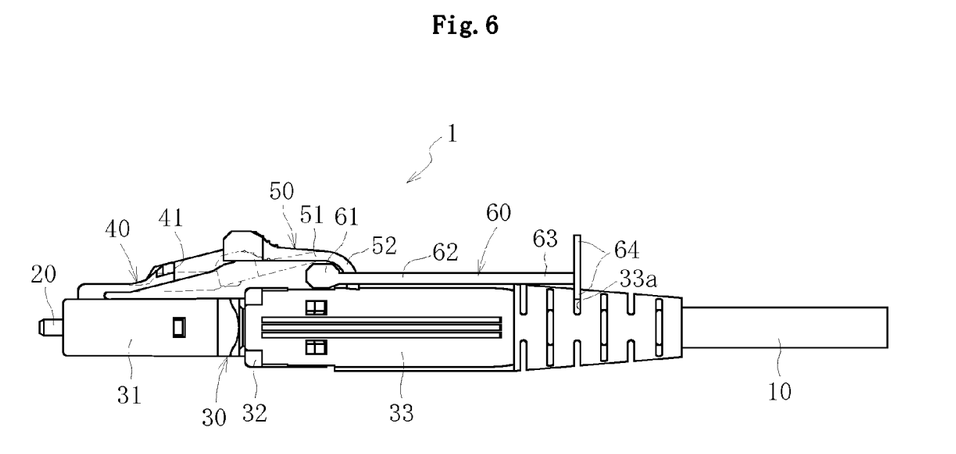
FIG. 6 A side view of the optical connector in a state in which the regulating member is located in a retracted position.

When the optical connector 1 is to be removed from the optical adapter, the regulating member 60 is moved backward to locate the regulating portions 61 below the rear end of the horizontal portion 51 of the operation arm 50 (retracted position) as illustrated in FIG. 6. At this time, by the presence of the horizontal portion 51 provided to the operation arm 50, a space extending in the longitudinal direction and having an approximately constant height is formed between the horizontal portion 51 and the upper surface of the retainer 30. Therefore, the regulating portions 61 can be easily moved backward to the retracted position. When the operation arm 50 is depressed in this state, the horizontal portion 51 is elastically deformed to move down the front end of the horizontal portion 51. In this manner, the rear ends of the latch arms 40 can be depressed (see a dotted line in FIG. 6). As a result, the locking portions 41 of the latch arms 40 and the locking grooves (not shown) of the optical adapter are disengaged from each other so as to allow the optical connector 1 to be removed from the optical adapter.

In a state in which the optical connector 1 is removed from the optical adapter, there is a fear in that the regulating member 60 comes off of the retainer 30 because the regulating member 60 and the retainer 30 are members independent of each other. In this embodiment, the regulating member 60 comprises the base portion 63, the pair of arms 62, and the regulating portions 61 projecting inward from the arms 62. The base portion 63, the pair of arms 62, and the regulating portions 61 form an approximately C-like shape surrounding the operation arm 50. Therefore, the regulating member 60 is locked to the operation arm 50 so as to be prevented from coming off of the retainer 30. At this time, when the locking piece 64 is inserted into one of the slits 33a of the boot 33 in a state in which the regulating member 60 is located in the retracted position as illustrated in FIG. 6, the regulating member 60 can be more reliably prevented from coming off of the retainer 30.

The regulating member 60 of this embodiment comprises the regulating portions 61, which are provided in pairs respectively to the front ends of the pair of arms 62 and are separated away from each other in the width direction. With the regulating portions 61 described above, the regulating member 60 can be mounted to the retainer 30 by inserting the operation arm 50 between the pair of regulating portions 61 in the width direction. Therefore, the regulating member 60 can be mounted to an existing optical connector.

The present invention is not limited to the above-mentioned embodiment. In the following embodiments, parts having the same functions as those in the above-mentioned embodiment are denoted by the same reference symbols, and redundant description thereof is omitted.

Figure 7:
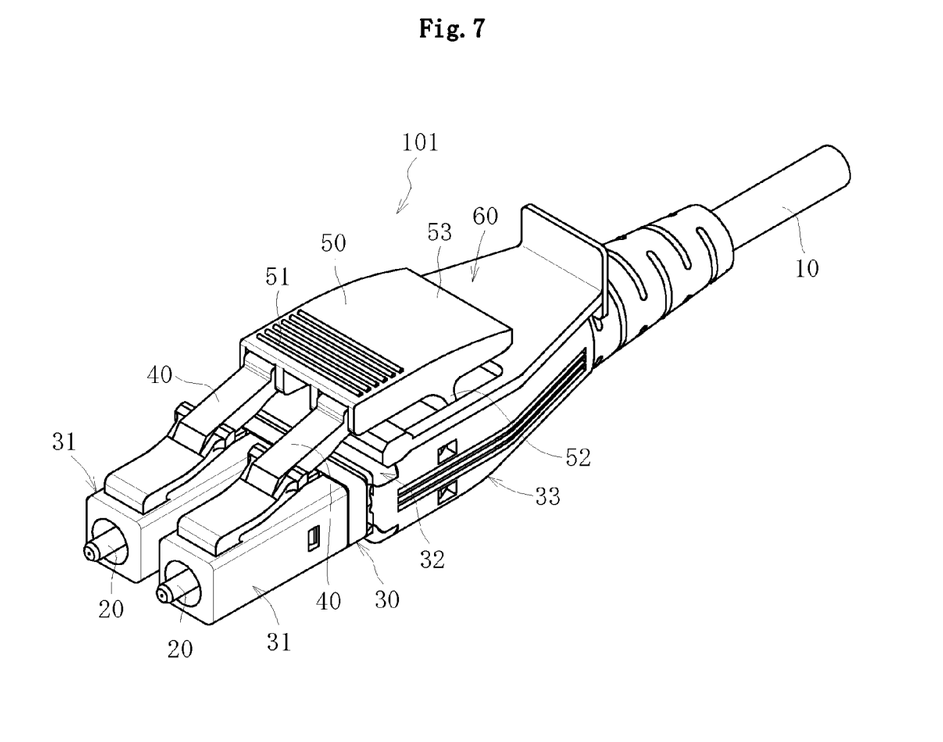
FIG. 7 A perspective view of an optical connector according to another embodiment of the present invention.
Figure 8:
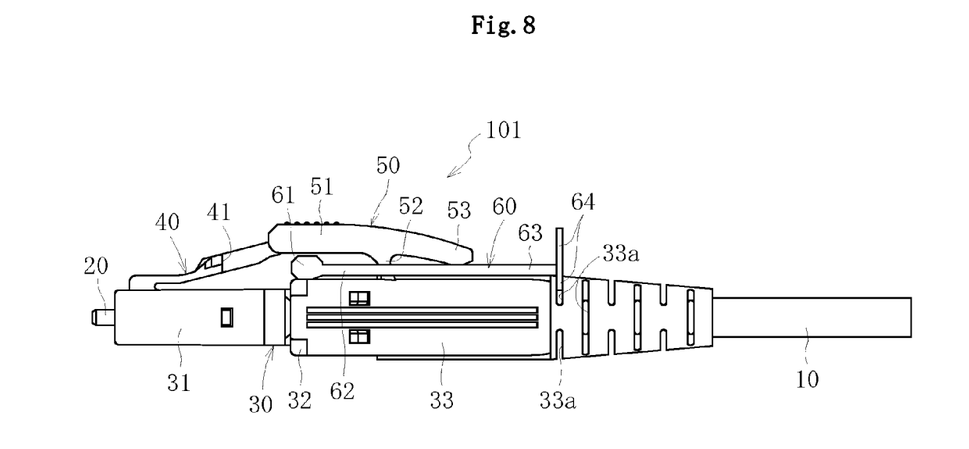
FIG. 8 A side view of the optical connector illustrated in FIG. 7 in a state in which a regulating member is located in a regulating position.
Figure 9:
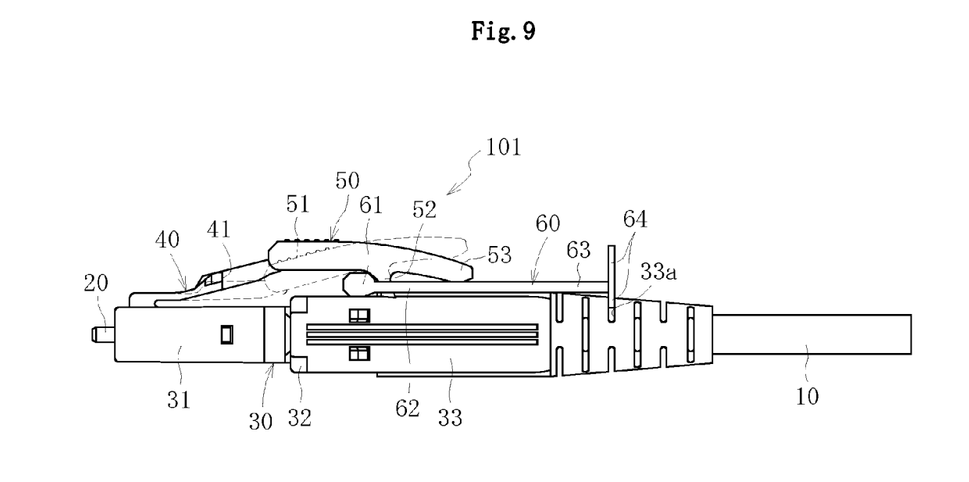
FIG. 9 A side view of the optical connector illustrated in FIG. 7 in a state in which the regulating member is located in a retracted position.

For example, an optical connector 101 illustrated in FIGS. 7 to 9 differs from the optical connector 1 of the embodiment described above in that the operation arm 50 comprises an extending portion 53 which extends backward beyond the continuous portion 52. As illustrated in FIG. 8, the extending portion 53 extends backward from the rear end of the horizontal portion 51 (portion at which the continuous portion 52 is connected) beyond the continuous portion 52. The extending portion 53 is slightly inclined downward from a horizontal level as becoming closer to the rear side. In the optical connector 101, the regulating member 60 is located at the regulating portion. In this manner, the regulating portions 61 regulate the downward movement of the front end of the operation arm 50 to prevent an event in which the optical connector 101 is unexpectedly removed from the optical adapter (see FIG. 8). Moreover, as illustrated in FIG. 9, by depressing the front end of the horizontal portion 51 of the operation arm 50 in a state in which the regulating member 60 is located in the retracted position, the rear ends of the latch arms 40 are depressed. As a result, the locking portions 41 of the latch arms 40 and the locking grooves of the optical adapter are disengaged from each other (see a dotted line in FIG. 9). The front end of the horizontal portion 51 of the operation arm 50 may be depressed by directly depressing the horizontal portion 51 from above or by pushing up the extending portion 53.

Figure 10:
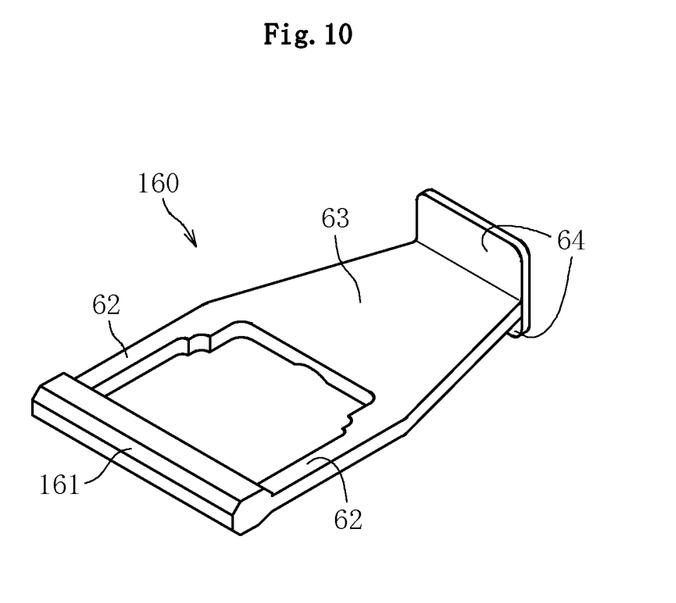
FIG. 10 A perspective view of a regulating member according to a further embodiment of the present invention.

Although the regulating portions 61 of the regulating member 60 are provided at the two positions separated away from each other in the width direction in the embodiments described above, the regulating portions 61 are not limited thereto. For example, a regulating member 160 illustrated in FIG. 10 comprises the regulating portion 161 which connects the front ends of the pair of arms 62. With the regulating portion 161, the regulating portion 161, the arms 62, and the base portion 63 are formed into a continuous annular shape. In order to assemble the regulating member 160 to each of the optical connectors 1 and 101 of the embodiments described above, the boot 33 is first removed from the clip 32. Then, the operation arm 50 and the latch arms 40 are separated away from each other in the longitudinal direction. Subsequently, the horizontal portion 51 of the operation arm 50 is inserted into the regulating member 160 formed into the annular shape. In this state, the boot 33 is mounted to the clip 32 again. The front end of the operation arm 50 is brought into contact with the rear ends of the latch arms 40 from above. In this manner, an event in which the regulating member 160 comes off of the retainer 30 can be reliably prevented.

Although the locking mechanism for regulating the movement of the regulating member 60 in the longitudinal direction while keeping the regulating member 60 in the regulating position comprises the locking piece 64 of the regulating member 60 and the slits 33a of the boot 33 in the embodiments described above, the locking mechanism is not limited thereto. For example, the following configuration (not shown) may be used for the locking mechanism. Specifically, a pin, which projects downward, is provided to the regulating member 60, whereas a hole is provided to the boot 33. The pin of the regulating member 60 is inserted into the hole of the boot 33. Moreover, the locking mechanism is not limited to the locking mechanism for realizing mechanical engagement, but may also be a locking mechanism for fixing the regulating member 60 and the retainer 30 by, for example, an attraction force of a magnet or the like.

Further, although the double-fiber optical connectors 1 and 101 have been described above in the embodiments, the application of the present invention is not limited thereto. For example, the present invention may be applied to a single-fiber optical connector.

Further, although the operation arm 50 is provided integrally with the boot 33 in the embodiments described above, the location at which the operation arm 50 is provided is not limited thereto. For example, the operation arm 50 may be provided integrally with the clip 32.

The invention claimed is:

1. An optical connector, comprising:
   a ferrule;
   a retainer for retaining the ferrule inside thereof;
   a latch arm extending backward from an upper surface of the retainer, the latch arm comprising a rear end elastically movable in a vertical direction;
   an operation arm extending forward from the upper surface of the retainer, the operation arm comprising a front end elastically movable in the vertical direction and provided above the rear end of the latch arm; and
   a regulating member having a regulating portion provided between a lower surface of the operation arm and the upper surface of the retainer,
   wherein the regulating member is movable in a longitudinal direction between a regulating position for regulating downward movement of the front end of the operation arm by the regulating portion and a retracted position for allowing the downward movement of the front end of the operation arm, the retracted position being located behind the regulating position.

2. The optical connector according to claim 1, the regulating member comprising:
   a base portion provided behind the operation arm; and
   a connecting portion for connecting the regulating portion and the base portion to each other.

3. The optical connector according to claim 1, further comprising a locking mechanism for regulating movement of the regulating member in the longitudinal direction while keeping the regulating member in the regulating position.

4. The optical connector according to claim 3, further comprising:
   a slit provided to the retainer; and
   a locking piece insertable into the slit and provided to the regulating member,
   wherein the slit and the locking piece constitute the locking mechanism.

5. The optical connector according to claim 1, wherein the operation arm comprises a horizontal portion approximately parallel to the upper surface of the retainer.

6. A regulating member to be mounted to an optical connector comprising:
   a ferrule;
   a retainer for retaining the ferrule inside thereof;
   a latch arm extending backward from an upper surface of the retainer, the latch arm comprising a rear end elastically movable in a vertical direction; and
   an operation arm extending forward from the upper surface of the retainer, the operation arm comprising a front end elastically movable in the vertical direction and provided above the rear end of the latch arm, the regulating member comprising:

a regulating portion provided between a lower surface of the operation arm and the upper surface of the retainer;

a base portion provided behind the operation arm; and a connecting portion for connecting the regulating portion and the base portion to each other.

* * * * *